United States Patent
Riss et al.

(10) Patent No.: US 9,772,977 B2
(45) Date of Patent: Sep. 26, 2017

(54) DISPLAYING A FOLDING DOCUMENT

(71) Applicant: Hewlett-Packard Development Company, L.P., Houston, TX (US)

(72) Inventors: Marcelo A. Riss, Porto Alegre (BR); Niranjan Damera Venkata, Chennai (IN); Rodrigo Chamun, Porto Alegre (BR); João Batista Souza de Oliveira, Porto Alegre (BR); Isabel H. Manssour, Porto Alegre (BR); Angelina de Carvalho Alvarez Ziesemer, Porto Alegre (BR)

(73) Assignee: Hewlett-Packard Development Company, L.P., Houston, TX (US)

( * ) Notice: Subject to any disclaimer, the term of this patent is extended or adjusted under 35 U.S.C. 154(b) by 300 days.

(21) Appl. No.: 14/080,253

(22) Filed: Nov. 14, 2013

(65) Prior Publication Data

US 2015/0135062 A1    May 14, 2015

(51) Int. Cl.
| | | |
|---|---|---|
| *G06F 17/00* | (2006.01) | |
| *G06F 17/21* | (2006.01) | |
| *G06F 3/0483* | (2013.01) | |
| *G06F 9/44* | (2006.01) | |
| *G06F 1/16* | (2006.01) | |
| *G06F 3/0481* | (2013.01) | |
| *G06F 3/12* | (2006.01) | |

(Continued)

(52) U.S. Cl.
CPC .......... *G06F 17/212* (2013.01); *G06F 3/0483* (2013.01); *G06F 1/1616* (2013.01); *G06F 3/0481* (2013.01); *G06F 3/0482* (2013.01); *G06F 3/04886* (2013.01); *G06F 3/127* (2013.01); *G06F 9/4443* (2013.01); *G06F 17/211* (2013.01)

(58) Field of Classification Search
CPC .... G06F 17/212; G06F 3/0483; G06F 3/0482; G06F 1/1616; G06F 1/641; G06F 3/0485; G06F 3/048; G06F 17/211; G06F 9/4443; G06F 3/04886; G06F 3/127
USPC .................... 715/762, 247, 790; 358/1.7–1.8
See application file for complete search history.

(56) References Cited

U.S. PATENT DOCUMENTS 7,937,654 B1    5/2011   Ayers et al.
8,139,256 B2    3/2012   Motamed
(Continued)

FOREIGN PATENT DOCUMENTS

GB    002436813 A  * 10/2007  ............. G06F 17/00
WO    2006096139       9/2006
(Continued)

OTHER PUBLICATIONS

Global Graphics Software, Gdoc Fusion, Gdoc Brochure, May 2010, Global Graphics Software Inc., Acton, MA. 4 pages.
(Continued)

*Primary Examiner* — Quoc A Tran
(74) *Attorney, Agent, or Firm* — Brooks, Cameron & Huebsch PLLC (57) ABSTRACT

A technique for displaying a folding document can include connecting an edge of a first panel to an edge of a second panel to create a shared edge representing a fold of a folding document. The first panel and second panel can form a first area of the folding document, and the first area and a second area of the folding document can be displayed in a graphical user interface (GUI).

19 Claims, 5 Drawing Sheets

(51) Int. Cl.
*G06F 3/0482* (2013.01)
*G06F 3/0488* (2013.01)

(56) References Cited

U.S. PATENT DOCUMENTS

| 8,386,945 | B1 | 2/2013 | Hansen et al. |
| 2004/0177325 | A1* | 9/2004 | Keane .................... G06F 17/24 715/255 |
| 2008/0141151 | A1* | 6/2008 | Saur ..................... G06F 3/1205 715/764 |
| 2008/0158599 | A1* | 7/2008 | Miwa .................... G06F 3/1205 358/1.15 |
| 2011/0258892 | A1* | 10/2011 | Taylor ..................... G09F 1/06 40/124.02 |
| 2012/0192046 | A1 | 7/2012 | Slatter et al. |
| 2012/0192047 | A1 | 7/2012 | Slatter et al. |
| 2012/0192092 | A1 | 7/2012 | Slatter et al. |
| 2012/0290925 | A1 | 11/2012 | Atkins et al. |
| 2012/0313926 | A1* | 12/2012 | Rolleston ............... G06T 15/00 345/419 |

FOREIGN PATENT DOCUMENTS

| WO | 2012102702 | 8/2012 |
| WO | 2012102704 | 8/2012 |
| WO | 2012102708 | 8/2012 |

OTHER PUBLICATIONS

Hunter, et al., "Web-based magazine design for self publishers", Published in "Imaging and Printing in a Web 2.0 World II", edited by Lin, Qian; Allebach, Jan P.; Fan, Zhigang. Proceedings of the SPIE, vol. 7879 (Feb. 2011), 6 pages.

Hunter, et al., "Automatic Page Composition with Combined Image Crop and Layout Metrics", Published in "Imaging and Printing in a Web 2.0 World III", edited by Lin, Qian; Allebach, Jan P.; Fan, Zhigang. Proceedings of the SPIE, vol. 8302 (Feb. 2012), 7 pages.

* cited by examiner

DISPLAYING A FOLDING DOCUMENT

BACKGROUND

Folding documents, such as brochures, folders, and cards, can present information to readers in a coherent manner. A folding document, as used herein, can include a document that is designed to be folded and maintain an intended content arrangement to a viewer after being physically printed.

DETAILED DESCRIPTION

Designing folding documents can be difficult, because how the folding document will be folded after printing needs to be considered. For instance, a folding document can have a reverse printed side and can be folded in a variety of ways. It can be difficult to determine an appropriate layout for the reverse side that will result in a coherent printed folding document. For example, depending on the folding of the folding document, the user may place the content on a reverse side incorrectly (e.g., upside down when folded). Determining the appropriate layout can be frustrating to a user and/or may require trial and error to design a coherent folding document.

Currently available folding document creation applications can present a number of templates for a user to select from. The templates can have pre-defined folds and layouts. A user can revise the printable content within the template, however, the user cannot revise the layout and/or folds of the template.

In contrast, in accordance with a number of examples of the present disclosure, a user can customize a layout of a folding document. For instance, a folding document can be designed by displaying panels of predefined printable content in a graphical user interface (GUI). A panel of a folding document can include content area of a folding document that is not to be folded, for example. That is, the displayed panels of predefined printable content (herein generally referred to as "panels") can include a graphical representation of content that is not to be folded when the folding document is printed. The panels can, for instance, be of a certain size and/or shape (e.g., predefined). A user can select particular displayed panels of predefined printable content and connect the panels along edges to create shared edges representing a fold of the folding document. In various instances, the panels can be imported and the predefined pages of printable content can be edited while designing the folding document.

For instance, a user can select a first panel and a second panel from a plurality of panels displayed in a GUI, and connect an edge of the first panel to an edge of the second panel using a first user input (e.g., a mouse drag, dragging the panels together using a touch screen, etc.). The connection can create a first shared edge representing a fold of the folding document. The user can select a third panel and a fourth panel from the plurality of panels and connect an edge of the third panel to an edge of the fourth panel. The connection can create a second shared edge representing a reverse side of the fold of the folding document (e.g., the inverse of the fold). The first panel and second panel can form a first area of the folding document and the third panel and fourth panel can form a second area of the folding document. The first area and the second area can be concurrently displayed in the GUI. In various examples, a variety of numbers of panels can be connected, and the folding document can be displayed in the GUI as it would appear when physically printed and/or folded.

Figure 1:
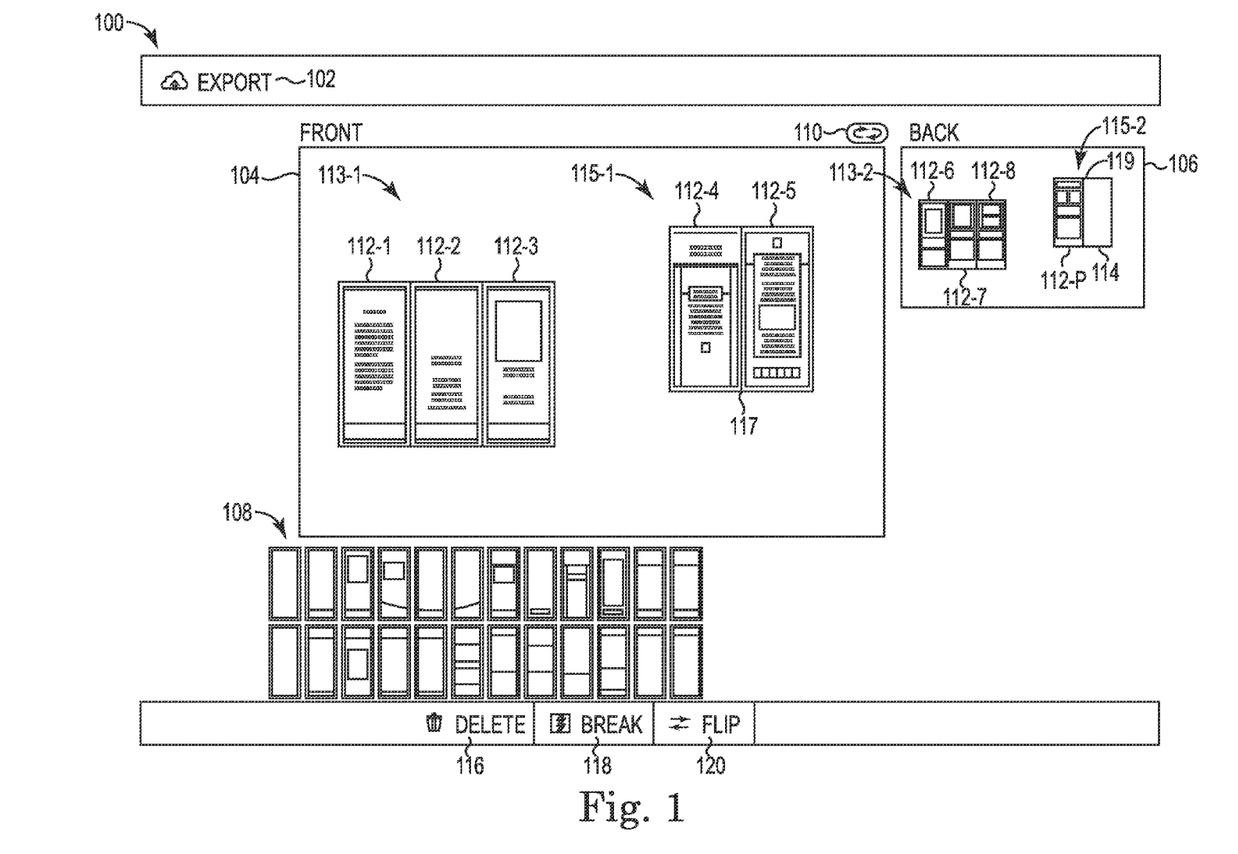
FIG. 1 is an example of a graphical user interface (GUI) for displaying folding documents according to the present disclosure.

FIG. 1 illustrates an example GUI 100 for displaying folding documents according to the present disclosure. The GUI 100 can include a number of working display areas presentable visually and/or audibly to a user and can include a number of actuable areas. For example, the GUI 100 can include working display areas in the form of a front view portion 104 and a back view portion 106 to a display screen of the GUI 100. The GUI 100 can also include actuable areas such as a plurality of panels 108, and a plurality of selectable icons to receive input to the GUI 100. In the example shown in FIG. 1 these can include an export 102 bar, a rotate icon 110, a delete icon 116, break icon 118, and flip icon 120, etc. Embodiments are not limited to these examples.

In this manner, the GUI 100 allows interactions between a user and a computing device to occur. The GUI 100 can be implemented by hardware components and program code, firmware, executable instructions and logic, e.g., hardware in the form of application specific integrated circuits (ASICs) to present text and graphics to a hardware display. The GUI 100 can be configured to receive inputs via a mouse, a touch screen, keyboard, etc., and can represent results, actions and tasks available to a user through graphical icons and visual indicators. That is, the GUI 100 is configured to receive inputs and present a working interface for a user. Further, the GUI 100 can receive inputs resulting from operations performed by computing engines and/or computing modules, also driven by inputs to the GUI, as described in connection with FIGS. 2A-2C.

Figure 2A:
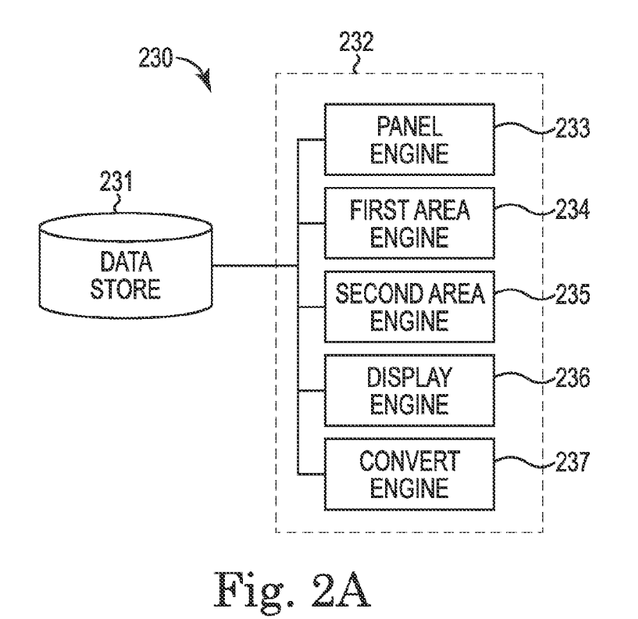
FIG. 2A illustrates example of a system according to the present disclosure.

FIG. 2A illustrates a diagram of an example of a system 230 for controlling and operating the GUI 100 illustrated in FIG. 1, e.g., for creating and displaying a folding document according to the present disclosure. The system 230 can include a data store 231 connected to a configuration system, e.g., design system 232. In this example the design system can include a number of computing engines. The example of FIG. 2A shows a panel engine 233, a first area engine 234, a second area engine 235, a display engine 236, and a convert engine 237. As used herein, a computing engine can include hardware, firmware, logic and executable instructions, but includes at least hardware to perform particular actions, tasks and functions described in more detail herein in reference to the GUI 100 of FIG. 1.

Figure 2B:
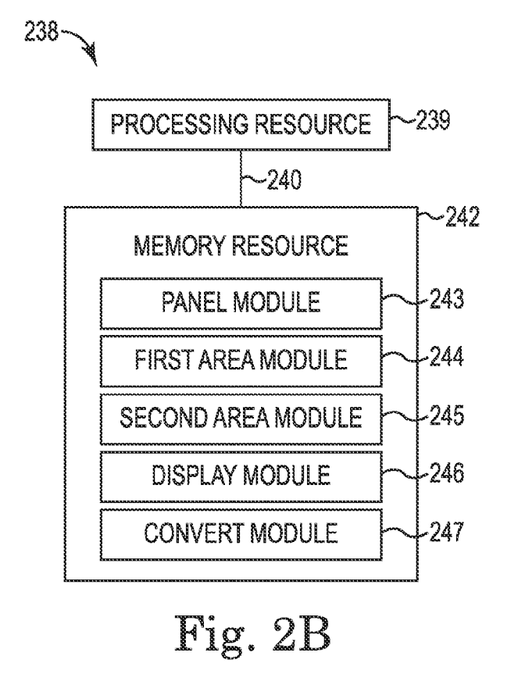
FIGS. 2B-2C illustrate examples of computing devices according to the present disclosure.

FIG. 2B illustrates an example computing device 238 according to the present disclosure. The computing device 238 can include a processing resource 239 connected to a memory resource 242, e.g., a computer-readable medium (CRM), machine readable medium (MRM), database, etc. The memory resource 242 can include a number of computing modules. The example of FIG. 2B shows a panel module 243, a first area module 244, a second area module 245, a display module 246, and a convert module 247. As used herein, a computing module can include program code (e.g., computer executable instructions), hardware, firmware, and/or logic, but includes at least instructions executable by the processing resource 239, e.g., in the form of modules, to perform particular actions, tasks and functions described in more detail herein in reference to the GUI 100 of FIG. 1. The processing resource 239 executing instructions associated with a particular module, e.g., 243, 244, 245, 246, and 247 can function as an engine, such as the example engines shown in FIG. 2A.

The number of engines, 233, 234, 235, 236 and 237, shown in FIG. 2A and/or the number of modules, 243, 244, 245, 246 and 247, shown in FIG. 2B can be sub-engines/modules of other engines/modules and/or combined to perform particular actions, tasks and functions within a particular system and/or computing device.

Figure 2C:
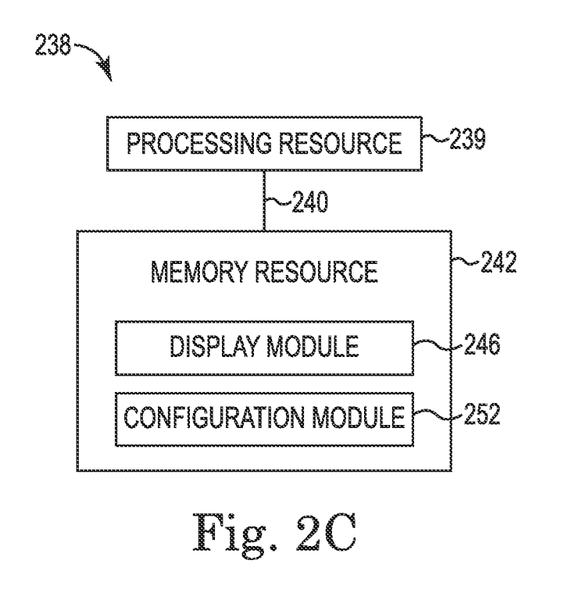

For example, FIG. 2C illustrates a computing device 238 that includes a processing resource 239 connected to a memory resource 242, but the memory resource 242 shows only a display module 251 and a configuration module 252. In this example, the configuration module 252 may represent a combined module that includes instructions executed by the processing resource 239 to perform the actions, tasks and functions associated with the panel module 243, the first area module 244, and the second area module 245 of FIG. 2B.

Further, the engines and/or modules described in connection with FIGS. 2A-2C can be located in a single system and/or computing device or reside in separate distinct locations in a distributed computing environment, e.g., cloud computing environment. Embodiments are not limited to these examples.

Returning to FIG. 1, a GUI 100 is shown responsive to input from a user and from operations performed by the above mentioned engines and/or modules, which also can be driven by inputs to the GUI 100, to create and display folding documents according to the present disclosure. In the example of FIG. 1, two different layouts (e.g., positioning) and designs (e.g., shapes, content, sizes) for folding documents are being created and displayed on the GUI 100 illustrating the ability to work on multiple, different folding documents concurrently. That is, in a front view area 104 of the GUI 100 a first area 113-1 of one, e.g., a first, folding document is shown having three joined panels 112-1, 112-2, and 112-3. A first area 115-1 of another, e.g., a second, folding document is also shown in the front view area 104 of the GUI 100. The first area 115-1 of the second folding document is shown having two joined panels 112-4 and 112-5.

In this example, in the back view area 106 of the GUI 100 a second area 113-2 of the first folding document is shown having three joined panels 112-6, 112-7, and 112-8. Likewise, in this example, a second area 115-2 of the second folding document is shown having two joined panels 112-P and 114. A folding document, as used herein, can include a document that is designed to be folded and maintain an intended content arrangement to a viewer after being physically printed. A panel of a folding document can include a selectable or preselected size, style, content, and/or geometry, e.g., the plurality of panels 108 shown in the GUI 100 of FIG. 1 that is intended not to be folded when the panel is printed. Different ones of the plurality of selectable panels 108 shown in FIG. 1 can include areas for editable content, e.g., content that can be edited and/or provided to the panel as text and/or graphics based on input to the GUI. Different ones of the plurality of selectable panels 108 can also include areas of non-editable content as text and/or graphics that may have been predefined or preselected. The selected panels 112-1, . . . , 112-P and 114, may all be different and individually selectable, based on input to the GUI 100, from the plurality of panels 108 shown in the GUI 100 of FIG. 1.

In operation, the panel engine 233 as shown in FIG. 2A, the panel module 243 of FIG. 2B, or the configuration module 252 of FIG. 2C, may operate using hardware and/or by executing instructions based on input to the GUI 100 to import, retrieve and/or create the plurality of panels 108 shown in FIG. 1. For example, the panel engine 233 as shown in FIG. 2A, the panel module 243 of FIG. 2B, or the configuration module of FIG. 2C can function based on input to the GUI 100 to retrieve the plurality of panels 108 from a remote device (e.g., a computing device), a remote system (e.g., a cloud system, the Internet, a service-oriented-architecture repository), and/or an application. The display engine 236 of FIG. 2A or the display modules 246 of FIGS. 2B and 2C may operate using hardware and/or executing instructions to display the plurality of panels 108 and the three joined panels 112-1 through 112-3 as a first area 113-1 of one, e.g., first, folding document in the front view portion 104 of the GUI 100 based on input to the GUI 100. Further, the display engine 236 of FIG. 2A or the display modules 246 of FIGS. 2B and 2C can function based on input to the GUI 100 to display the two joined panels 112-4 and 112-5 as a first area 115-1 of another, e.g., second, folding document in the front view portion 104 of the GUI 100.

Further, the display engine 236 of FIG. 2A, or the display modules 246 of FIGS. 2B and 2C, may operate using hardware and/or executing instructions to display the three joined panels 112-6 through 112-8 as a second area 113-2 of the first folding document, based on input to the GUI 100, in the back view portion 106 of the GUI 100. Additionally, the display engine 236 or display modules 246 may operate to display the two joined panels 112-P and 114 as a second area 115-2 of the second folding document, based on input to the GUI 100, in the back view portion 106 of the GUI 100.

A user can provide input to the GUI 100 to, e.g., using a touch screen, cursor controlled by a mouse, etc., to select any of the plurality of panels 108 to become associated with the first area 113-1 of the first document. Likewise, a user can provide input to the GUI 100 to select any of the plurality of panels 108 to become associated with the first area 115-1 of the second document. Similarly, a user can provide input to the GUI 100 to select any of the plurality of panels 108 to become associated with the second area 113-2 of the first document and to become associated with the second area 115-2 of the second document.

In at least one embodiment, a first area engine 234, shown in FIG. 2A, or first area module 244, shown in FIG. 2B, can respond to inputs to the GUI 100 to operate upon the panels 112-1, 112-2 and 112-3 that have been associated to a first area 113-1 of a first document. That is, a user can select particular displayed panels 108. Input can be provided to the GUI 100 to move selected panels and position selected panels away from or adjacent to one another along particular edges, e.g., via cursor or touchscreen input. Input to the GUI 100 can cause a first area engine 234, first area module 244, or configuration module 252 to connect the panels in a particular manner, e.g., in various combinations along edges of each respective panel, to create shared edges representing a fold of the first folding document. Further, the first area engine 234, first area module 244, or configuration module 252 can respond to inputs to the GUI 100 to operate upon each of the example panels 112-1, 112-2, and 112-3 independently, and/or collectively, to provide graphics and/or text to editable areas of the panels. For example, the first area engine 234, first area module 244, or configuration module 252 can respond to input typed into a keyboard or keypad associated with the GUI 100, or graphics and panel icons can be dragged and dropped into editable areas of one or more panels in the first area 113-1, e.g., via a cursor. As used herein, editing an "editable area of a selected panel" or "editable area for content" can include editing text in a selected panel, connecting two or more panels together, and/or revising the size, shape and/or orientation of a panel, among other changes to a folding document.

Input to the GUI 100 may also cause the first area engine 234, first area module 244, or configuration module 252 to rotate text, graphics and/or panels, break panels, delete panels, flip (open or closed) joined panels, etc. Such inputs to the GUI 100 may be provided, for example, using touchscreen, cursor selection, etc., upon the rotate icon 110, the delete bar 116, the break icon, the flip icon 120, etc. Embodiments are not limited to these examples.

As shown in FIG. 1, a first area engine 234, first area module 244, or configuration module 252 can respond to inputs to the GUI 100 to operate upon the panels 112-4 and 112-5 that have been associated to create a first area 115-1 of a second folding document. The first areas, 113-1 and 115-1 of two different folding document layouts (e.g., panel positioning) and designs (e.g., editable text and graphics) are shown in the front view portion 104 of the GUI 100 to demonstrate the ability to provide inputs to the GUI 100 in a manner that allows the first area engine 234, first area module 244, or configuration module 252 to work concurrently on multiple folding document layouts and designs in the front view portion 104. This can enable a user to experiment with several variations and options side by side. As above, inputs to the GUI 100 can select particular displayed panels 108 and provide input to the GUI 100 to cause a first area engine 234, first area module 244, or configuration module 252 to connect the selected panels 112-4 and 112-5 in a particular manner to create shared edges representing a fold 117 of the second folding document layout and design. Further, the first area engine 234, first area module 244, or configuration module 252 can respond to inputs to the GUI 100 to operate upon each of the example panels 112-4 and 112-5 analogously to that described for the panels 112-1, 112-2, and 112-3 associated with the first area 113-1 of the first document.

As shown in FIG. 1, inputs can be provided to the GUI 100, e.g., using a touch screen, cursor controlled by a mouse, etc., to select any of the plurality of panels 108 to become associated with the second area 113-2 of the first document and inputs provided to the GUI 100 can select any of the plurality of panels 108 to become associated with the second area 115-2 of the second document. In this manner, both first areas 113-1, 115-1 and second areas 113-2, 115-2 associated with first and second folding document layouts and designs can be viewed concurrently on the GUI 100.

In this example embodiment, a second area engine 235 shown in FIG. 2A, or a second area module 245 shown in FIG. 2B, or a configuration module shown in FIG. 2C can respond to inputs to the GUI 100 to operate upon the panels 112-6, 112-7 and 112-8 that have been associated to a second area 113-2 of a first document. That is, a user can select particular displayed panels 108. Input can be provided to the GUI 100 to move selected panels and position selected panels away from or adjacent to one another along particular edges, e.g., via cursor or touchscreen input. Input to the GUI 100 can cause the second area engine 235, second area module 245, or configuration module 252 to connect the selected panels in a particular manner, e.g., in various combinations along edges of each respective panel, to create shared edges representing one or more folds of the first folding document. Further, the second area engine 235, second area module 245, or configuration module 252 can respond to inputs to the GUI 100 to operate upon each of the example panels 112-6, 112-7 and 112-8 independently, and/or collectively, to provide graphics and/or text to editable areas of the panels. For example, the second area engine 235, second area module 245, or configuration module 252 can respond to input typed into a keyboard or keypad associated with the GUI 100, or graphics and panel icons can be dragged and dropped into editable areas of one or more panels in the second area 113-2, e.g., via a cursor.

Input to the GUI 100 may also cause the second area engine 235, second area module 245, or configuration module 252 to rotate text, graphics and/or panels, break panels, delete panels, flip (open or closed) joined panels, etc. Such inputs to the GUI 100 may be provided, for example, using touchscreen, cursor selection, etc., upon the rotate icon 110, the delete bar 116, the break icon, the flip icon 120, etc., as described above.

Also, as shown in FIG. 1, a second area engine 235, second area module 245, or configuration module 252 can respond to inputs to the GUI 100 to operate upon the panels 112-P and 114 that have been associated to create a second area 115-2 of a second folding document. The second areas, 113-2 and 115-2 of two different folding document layouts (e.g., panel positioning) and designs (e.g., editable text and graphics) are shown in the back view portion 106 of the GUI 100 to demonstrate the ability to provide inputs to the GUI 100 in a manner that allows the second area engine 235, second area module 245, or configuration module 252 to work concurrently on multiple folding document layouts and designs in the back view portion 106. This can enable a user to experiment with several variations and options side by side in the back view portion 106. As above, inputs to the GUI 100 can select particular displayed panels 108 and provide input to the GUI 100 to cause the second area engine 235, second area module 245, or configuration module 252 to position selected panels away from or adjacent to one another and to connect the selected panels 112-P and 114 in a particular manner to create shared edges representing a fold of the second folding document layout and design. Further, the second area engine 235, second area module 245, or configuration module 252 can respond to inputs to the GUI 100 to operate upon each of the example panels 112-P and 114 analogously to that described for the panels 112-6, 112-7, and 112-8 associated with the second area 113-2 of the first document.

Further the back view portion 106 of the GUI 100 illustrates the ability to provide inputs to the GUI 100 in a manner that allows the display engine 236 or display modules 246 to show a second area folding document view, e.g., showing second areas 113-2 and 115-2, alongside with and on a same display as first area folding document views, e.g., showing first areas 113-1 and 115-1. This can enable a user to experiment with several variations and options of first area and second area layout and design, side by side, on one screen, e.g., concurrently in a front view portion 104 and a back view portion 106. In some examples, only one area, or only one area at a time, in the front view portion 104 or back view portion 106 may be editable for content using input to the GUI 100 and input provided to the GUI 100 to direct operation of the first area engine/module 234/244 or the second area engine/module 235/245.

The display engine 236 or display modules 246 can function based on inputs to the GUI 100 to cause the front view portion 104 of the GUI 100 to display an intended front view of an area of the folding document. Thereby, the first areas 113-1, 115-1 displayed by the display engine 236 or display modules 246 may be an intended front view of each of the folding documents. Collectively, the first area 113-1 and second area 113-2 may be referred to as a first folding document 113, and the first area 115-1 and second area 115-2 may be referred to as a second folding document 115.

Similarly, the display engine 236 or display modules 246 can function based on inputs to the GUI 100 to cause the back view portion 106 of the GUI 100 to display an intended back view of an area of the folding document. That is, the area of the folding document in the back view portion 106 of the GUI 100 can be on an opposite side of the folding document relative to the concurrently displayed area in the front view portion 104 of the GUI 100. The second areas 113-2, 115-2 displayed by the display engine 236 or display modules 246 may be an intended back view of each of the folding documents 113, 115.

A front view of an area of a folding document, as used herein, can include a view of an intended front area of the folding document as the front area is intended to appear when printed. In contrast, a back view of an area of the folding document may be a mirror image, e.g., inverse image, of the back area from how the back area is intended to appear when folding document is printed and viewed. That is, the display engine 236 or display modules 246 can display the back view as a mirror image of how a particular area will appear when printed by arranging the position of panels such that the panels are displayed in an order the follows the order of the panels in the front view.

That is, the display engine 236 in FIG. 2A can arrange the position of the panels displayed in a back view portion 106 of the GUI 100 to match the position of the panels in the front view portion 104 of the GUI 100 that each panel in the back view portion 106 is correspondingly to be printed on. Thus, the back view portion 106 can include a graphical preview of the panels that are to be physically printed on the opposite sides, e.g., back sides, of the panels in the front view portion 104 of the GUI 100 (e.g., a view as though a user is looking through the folding document from the point of view of the front view portion 104 to preview the panels located on and/or to be printed on the opposite side, e.g., back side, of the panels in the front view portion 104).

As an example, the display engine 236 or display modules 246 can display a particular panel 112-6 on the left side of an area of the folding document (e.g., second area 113-2 of the folding document) in the back view portion 106 of the GUI 100 that is actually to be printed on and/or located on the opposite side of a particular panel 112-1 on the left side of the area of the folding document (e.g., first area of the 113-1 folding document) in the front view portion 104 of the GUI 100.

According to embodiments, a convert engine 237 or convert module 247 may operate using hardware and/or by executing instructions based on input to the GUI 100 to convert the display of the particular panel 112-6 on the left side of the area, e.g., second area 113-2, of the folding document to a back view as will occur when printed. For example, the particular panel 112-6 in a back view, opposite panel 112-1, will print on the right side (from a viewer's perspective) of the second area 113-2 of the folding document in order to be on the back of panel 112-1 in a front view. Thus, the convert engine can respond to input to the GUI 100 to convert an area of a folding document to a view on the GUI 100 representing a view a viewer will have when the folding document is printed.

By way of example, and not by way of limitation, the first folding document 113 shown in the GUI 100 of FIG. 1 illustrates a folding document containing six panels 112-1, 112-2, 112-3, 112-6, 112-7, and 112-8. As the reader will appreciate, in this example, a user may have selected and directed via input to the GUI 100, e.g., using touchscreen selection, cursor movement, etc., to place panels 112-1, 112-2, and 112-3 in the front view portion 104 of the GUI 100 as a first area 113-1 of the first folding document 113. The display engine 236 or display modules 246, in response to such input, can then display the three panels, 112-1, 112-2, and 112-3, in the front view portion 104 of the GUI 100. As described herein, input to the GUI 100 can then cause a first area engine 234, first area module 244, or configuration module 252 to selectably connect the three panels 112-1, 112-2, 112-3 to create the shared edges shown representing folds to the first area 113-1 of the first folding document 113.

In this example, a user may have additionally selected and directed via input to the GUI 100 to place panels 112-6, 112-7, 112-8 in the back view portion 106 of the GUI 100 as a second area 113-2 of the first folding document 113. The display engine 236 or display modules, in response to such input, can then display the three panels, 112-6, 112-7, and 112-8, in the back view portion 106 of the GUI 100. As described herein, input to the GUI 100 can cause a second area engine 235, a second area module 245, or configuration module 252 to selectably connect the three panels 112-6, 112-7, and 112-8 to create the shared edges shown representing folds to the second area 113-2 of the folding document 113 and a reverse side of folds shown in the first area 113-1. That is, the panels 112-6, 112-7, and 112-8 in the second area 113-2 can represent panels on the opposite side of the folding document 113 relative to the panels 112-1, 112-2, and 112-3 in the first area 113-1, e.g., represent panels to be printed and/or folds to be located and folded on the opposite side of the folding document. In this example, the display engine 236 or display modules 246 operate, based on input to the GUI 100, to display the panels 112-1, 112-2, and 112-3 in back view portion of GUI 100 according to an inverse image (e.g., view) from a manner in which the panels will be viewed when printed.

As noted, according to embodiments, a convert engine 237 or convert module 247 may operate using hardware and or by executing instructions based on input to the GUI 100 to convert the second area 113-2 to an intended printable format and to print panels 112-6, 112-7, and 112-8 on an opposite side of panels 112-1, 112-2, and 112-3. Thus, in this example, when the printable format is printed, the fourth panel 112-6 will be printed on and/or located on the back of the first panel 112-1, the fifth panel 112-7 will be printed on and/or located on the back of the second panel 112-2, and the sixth panel 112-8 will be printed on and/or located on the back of the third panel 112-3.

As shown in the example of the GUI 100 in FIG. 1, a user may also concurrently operate on a folding document of a different layout and design, e.g., document 115. As above, a user may select and connect panels in a first area 115-1 and/or second area 115-2 to a second folding document using the display engine 236 or display modules 246, the first and/or second area engines 234/235, and the first and/or second area modules 244/245 or configuration module 252 as described above. In this manner, a user may concurrently work on multiple projects or experiment with different layouts and designs for a same set of content. The second folding document example shown in the GUI of FIG. 1 illustrates a folding document with a single fold.

In this example, the second folding document 115 includes four panels 112-4, 112-5, 112-P, and 114 joined by one shared fold. The display engine 236 or display modules 246 display two of the panels, e.g., panels 112-4 and 112-5 in the front view portion 104 of the GUI 100 and two of the panels, e.g., panels 112-P and 114, in the back view portion 106 of the GUI 100. The panels 112-4, 112-5 displayed in the front view portion 104 of the GUI 100 represent a first area 115-1 to the second folding document. The panels 112-P and 114 represent a second area 114-2 to the folding document displayed in the back view portion 106 of the GUI 100.

As before, the display engine 236 in FIG. 2A can display the panels 112-P and 114 in the second area 115-2 as a mirror, e.g., inverse image, relative to how the panels will be viewed when printed. That is, the third panel 112-P can be printed on and/or located on the back of the first panel 112-4, and the fourth panel 114 can be printed on and/or located on the back of the second panel 112-5.

A first area engine 234, a first area module 244, or configuration module 252 can operate based on input to the GUI 100 to connect a first panel 112-4 to a second panel 112-5 to create a first shared edge representing a fold 117 to a first area 115-1 of the folding document. A second area engine 235 or second area module 245 can operated based on input to the GUI 100 to connect a third panel 112-P to a fourth panel 114 to create a second shared edge in the second area 115-2 of the folding document representing a reverse side of the fold 117 shown in the first area 115-1.

According to some embodiments, the display engine 236 or display modules 246 can display empty panels in response to input to the GUI 100. For example, the display engine 236 or display modules 246 can display empty panels in the back view portion 106 of the GUI 100, for instance, in response to a user dropping panels in the front view portion 104 of the GUI 100 and/or the first area engine 234, first area module 244, or configuration module 252 creating a shared edge (e.g., fold 117) between one or more panels in the front view portion 104 of the GUI. In such examples, the number of empty panels displayed by the display engine 236 or display modules 246 in the back view portion 106 of the GUI 100 can include the same number of panels displayed by the display engine 236 or display modules 246 in the front view portion 104 of the GUI 100. For example, if four panels are connected in the front view portion 104, four empty panels may be connected and displayed in the back view portion 106. In this manner, a user may readily see a visual indication on the GUI that additional panels may need to be selected for a first area and/or second area of a folding document that is being created. An example of this is shown in the GUI 100 of FIG. 1 where panel 114 in the back view portion 106 of the GUI 100 is blank indicating that another panel still needs to be selected for the second area 115-2 of the folding document being created.

Although the examples shown in the GUI 100 of FIG. 1 illustrates folding documents with one fold and two folds, and folding documents with four panels and six panels, examples in accordance with the present disclosure are not so limited. For instance, a folding document may be created and displayed in the GUI 100 including more or less than two folds and/or more or less than six panels. Further, the fold(s), in various examples, can include vertical, diagonal, and/or horizontal folds and/or combinations of the same. For example, a folding document can include a document to be folded accordion style (e.g., horizontal or vertical folds), and/or folded like a map (e.g., contain both vertical and horizontal folds), etc. As used herein, a horizontal fold can include a fold created by connecting horizontal edges of panels relative to a horizontal orientation from a particular view. A vertical fold can, by contrast, include a fold created by connecting vertical edges of panels relative to the particular view.

In some example embodiments, the display engine 236 or display modules 246 can operate based on input received to the GUI to switch the display of one or more first areas, e.g., 113-1, 115-1, of the folding documents 113, 115 from a front view portion 104 of the GUI 100 to a back view portion 106 of the GUI 100. The display engine 236 or display modules 246 can similarly operate to switch the second areas 113-2, 115-2 from the back view portion 106 of the GUI to the front view portion 106. The switch can result, for instance, in the first areas 113-1, 115-1 of the folding documents 113, 115 being displayed by the display engine 236 or display modules as intended back views of a folding document when printed. The display engine 236 or display modules can operate based on input to the GUI 100 to display the first areas 113-1, 115-1 in the back view portion 106 of the GUI 100 as mirror images, e.g., inverse images, to how the first areas 113-1 and 115-1 are intended to appear when printed. However, a display engine 236 or display modules 246 or a convert engine 237 or convert module 247 may operate based on input to the GUI 100 to reverse the ordering of a group of joined panels when moved between the front view portion 104 and the back view portion 106 of the GUI 100 in order to display the panels as they are intended to be viewed when printed. For example, the first panel 112-1 that is displayed by the display engine 236, display modules 246, convert engine 237, convert module 247, etc., on the left side when the first area 113-1 is displayed in the front view portion 104 of the GUI 100 can be displayed on the right side of the panel order when displayed in the back view portion 106 of the GUI 100.

As mentioned above, various inputs to the GUI 100 can adjust size, shape, edit content, and/or change position of selected panels in the front view portion 104 and/or the back view portion 106 of the GUI 100. As shown in FIG. 1, inputs to the GUI can further include a user selecting a rotate icon 110 and/or a flip icon 120. An icon, as used herein, can include a graphic on the GUI 100 that provides a function when selected. A user can select the icon, for instance, by clicking a mouse, highlighting the icon, clicking the icon using a finger on a touch screen, hitting a key on keyboard, etc. In one example, the display engine 236 or display modules 246 can switch the display of a first area, e.g., 113-1, 115-1, of a folding document, e.g., 113, 115 to the back view portion 106 of the GUI 100 and switch the display of a second area, e.g., 113-2, 115-2, of the folding document 113, 115 to the front view portion 104 of the GUI 100 in response to a user selecting the flip icon 120 in the GUI 100. The switch can include a direct switch without further graphics, for instance.

Inputs to the GUI 100 can cause the display engine 236 or display modules 246 to operate to change an orientation of the first area 113-1, 115-1 and/or the second area 113-2, 115-2 within a front view portion 104 and back view portion 106 and/or between front and back view portions 104 and 106 of the GUI 100 by rotating each portion about an axis, e.g., in response to a user selecting the rotate icon 110 in the GUI 100. An axis can include a horizontal, diagonal and/or vertical axis, etc. That is, inputs to the GUI 100 can cause a display engine 236 or display modules 246 to rotate a first area, e.g., 113-1 115-1, in the front view portion 104 of the GUI 100 about a vertical axis (e.g., about a y-axis) resulting in the second area 113-2 of the first folding document 113, previously in a back view portion 106 of the GUI 100, being displayed in the front view portion 104. The display engine 236 in FIG. 2A can further rotate the back view portion 106 of the GUI 100 in a clockwise rotation about the vertical axis (e.g., the y-axis) resulting in the first area 113-1 of the first folding document 113 being displayed in the back view portion 106 of the GUI 100. In some examples, the display engine 236 or display modules 246 operate based on input received to the GUI 100 to rotate the front view portion 104 and the back view portion 106 of the GUI 100 simultaneously.

As illustrated by FIG. 1, the GUI 100 can include a variety of icons. For instance, the GUI 100 can include an export icon 102, a delete icon 116, and/or a break icon 118, among other icons. As discussed above, the convert engine 237 or convert module 247 can operate based on input received to the GUI 100 to export a displayed folding document to external applications, devices, and/or systems in response to selection of the export icon 102 in the GUI 100. For example, the export icon 102 can be used to send the displayed folding document to a printer. In various examples, the convert engine 237 or convert modules 247 can operate based on input received to the GUI 100 to convert a displayed folding document to a particular format, e.g., portable document format (PDF), when the export icon 102 is selected. Embodiments, however, are not limited to this example.

The display engine 236 or display modules 246 can further operate based on input to the GUI 100 to delete selected panels and/or portions of a folding document displayed in the front view portion 104 and/or back view portion 106 of the GUI 100 in response to selecting the delete icon 116, etc. For instance, the delete icon 116 can be used to remove a panel that is currently displayed. The display engine 236 or display modules 246 can also operate based on input received to the GUI 100 to disconnect connected panels, e.g., in response to a user selecting the break icon 118. As an example, the display engine 236 or display modules 246 can display the first panel 112-1 disconnected from the second panel 112-2 of the first folding document 113 in response to a user selecting the break icon 118 and selecting (e.g., clicking) the first panel 112-1.

The display engine 236 or display modules 246 can, in response to input received to the GUI 100, replace a panel displayed in the front view portion 104 and/or the back view portion 106 of the GUI 100, e.g., in response to a user selecting a new panel from the plurality of panels 108 and placing the new panel over the currently displayed panel. For instance, the display engine 236 or display modules 246 can replace the first panel 112-1 in the first folding document 113 in response to a user selecting a new panel from the plurality of panels 108, dragging the new panel over the first panel 112-1, and dropping (e.g., releasing with a mouse, finger, etc.) the new panel over the first panel 112-1 in the GUI 100. Other panels shown in the GUI 100 example of FIG. 1 can be similarly replaced.

Although the present example illustrates connecting a first panel to second panel along edges to create a shared edge representing a fold of the folding document, examples in accordance with the present disclosure are not so limited. In some examples, a first panel can be connected to a second panel along edges to form a continuous panel of the folding document. For example, a first area engine 234, first area module 243, or configuration module 252 can operate, based on input to the GUI 100, to connect panels to form a continuous first area, e.g., without folds, of the folding document. A second area engine 235, second area module 245, or configuration module 252 can operate, based on input to the GUI 100, to connect panels to form a continuous second area of the folding document. Such continuous panels created in a folding document can include the sum of the panels connected and can similarly be moved and operated upon, e.g., edited, sized, exchanged between a front view portion 104 and the back view portion 106 of the GUI 100 as the same has been described above. In this manner, the plurality of panels 108 can be joined, e.g., using a first area engine/module 234/244, second area engine/module 235/245, or configuration engine/module 252, to create a continuous panel for folding document that is larger than a particular selected panel among the plurality of panels 108.

Figure 3:
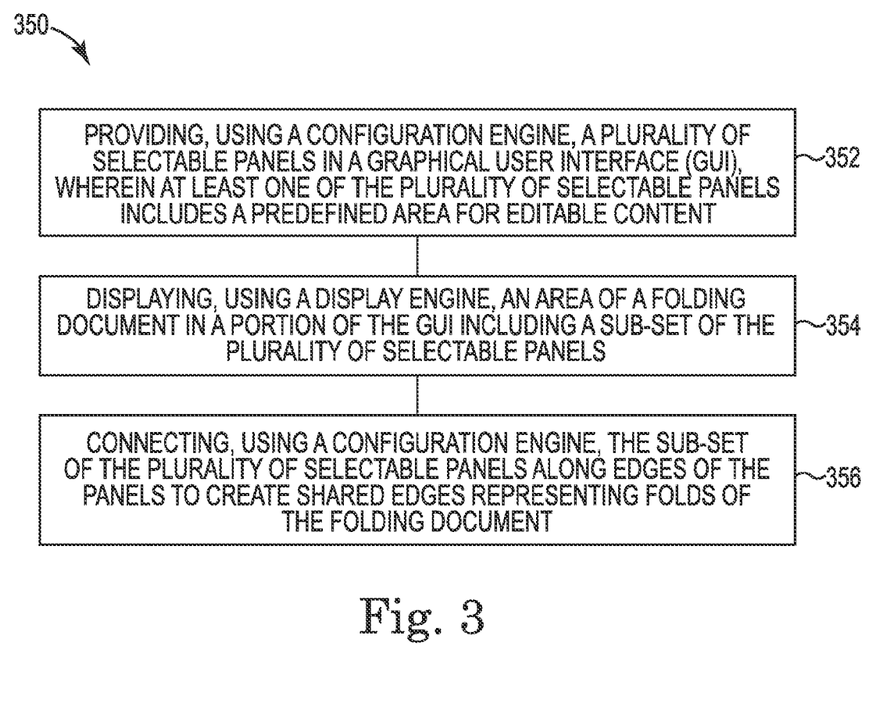
FIG. 3 is a flow chart illustrating an example of a method for controlling and operating a GUI in order to create and display a folding document according to the present disclosure.

FIG. 3 is a flow chart illustrating an example of a method 350 for controlling and operating a GUI in order to create and display a folding document according to the present disclosure. In various embodiments the method 350 can be performed using the system 230 shown in FIG. 2A, the computing device and modules shown and described in FIG. 2B, or the computing device and modules shown and described in connection with 2C. Embodiments, however, are not limited to these example systems, devices, and/or modules.

At 352, the method 350 can include providing a plurality of selectable panels to a GUI, e.g., the plurality of selectable panels 108 shown in the GUI of FIG. 1. As described above each of the selectable panels can include a particular size and geometry that may be predefined and adjustable according to the embodiments described herein. The plurality of selectable panels may be created and retrieved from a remote computing device and/or imported from a cloud computing system, Internet service, etc. For example, a panel engine 234 in FIG. 2A can retrieve the plurality of panels 108 from a data store 231 to display on the GUI of FIG. 1 based on input to the GUI 100. Additionally, a panel module 243 shown in FIG. 2B can include instructions executed by a processing resource 239 based on input to the GUI 100 to retrieve the plurality of panels 108. Further, as shown in FIG. 2C, a configuration module 252 can include instructions executed by a processing resource 239 to function as a configuration engine based on input to the GUI 100 to retrieve and display the plurality of selectable panels 108 to the GUI 100 where at least one of the selectable panels includes a predefined area for editable content.

At 354, the method 350 can include displaying an area, e.g., a first area, second area, etc., of a folding document, in a portion of the GUI. For example, the area may be displayed in a front view portion 104 or back view portion 106 of the GUI 100 shown in FIG. 1. According to some examples, the display of an area of the folding document can include a sub-set of the plurality of selectable panels. A display engine 236, as described in connection with FIG. 2A, can be used to display the area of a folding document including a sub-set of the plurality of selectable panels based on input to the GUI 100 shown in FIG. 1. Alternatively, a display module 246 shown in FIGS. 2B and 2C can include instructions executed by a processing resource 239 to display the area of the folding document including a sub-set of the plurality of selectable panels.

In one example, as described above, a display module 246 can include instructions executed by a processing resource 239 to display a first area 113-1 of a first folding document in one view, e.g., a front view portion 104 of the GUI 100 shown in FIG. 1. Likewise, the display modules 246 can include instructions executed by the processing resource to display another area, e.g., second area 113-2, of the first folding document in another view, e.g., back view portion 106 of the GUI 100 shown in FIG. 1. The first area 113-1 may include a first sub-set of the plurality of selectable panels and the second area 113-2 may include a different, e.g., second, subset of the plurality of selectable panels based on input to the GUI 100.

At 356, the method 350 can include connecting the subset of the plurality of selectable panels along edges of the panels to create shared edges representing folds of the folding document, e.g., as a first sub-set of panels 112-1, 112-2, and 112-3 shown in first area 113-1 of the GUI 100. As described above, a first area engine 234 can connect a first sub-set of panels, 112-1, 112-2, and 112-3, along edges of the panels to create shared edges representing folds of the folding document based on input to the GUI 100. Additionally, a first area module 244 can include instructions that can be executed by a processing resource 239 to connect a first sub-set of panels, 112-1, 112-2, and 112-3, along edges of the panels to create shared edges representing folds of the folding document based on input to the GUI 100. Alternatively, as shown in FIG. 2C, a configuration module 252 can include instructions that can be executed by the processing resource 239 to function as a configuration engine based on input to the GUI 100 to connect the subset of the plurality of selectable panels along edges of the panels to create shared edges representing folds of the folding document. Embodiments are not limited to these examples. According to some examples, the panels can be connected along horizontal edges, vertical edges, diagonal edges, etc.

In one example, each of a first sub-set of the plurality of selectable panels can be connected to at least one of the remaining first sub-set of the plurality of selectable panels. For instance, a right vertical edge of a first panel, e.g., 112-2 in FIG. 1, can be connected to a left vertical edge of a second panel, e.g., 112-3 in FIG. 1, and the left vertical edge of the first panel, 112-2, can be connected to a right vertical edge of a third panel, e.g., 112-1 in FIG. 1. Further to this example, in various instances, a top horizontal edge of the first panel, 112-2, could be connected to a bottom horizontal edge of a fourth panel (not shown) and so forth. In this manner, a variety of panels can be selectively connected in a variety of directions. The first and/or second area engines 234/235 shown in FIG. 2A, the first and/or second area modules 244/245 shown in FIG. 2B, or the configuration module 252 shown in FIG. 2C can provide the functionalities described above in relation to connecting panels along edges to create shared edges representing folds of the folding document.

As the reader will appreciate, in various examples the method can include using the display engine 236 or display modules 246 to additionally display a second area, e.g., 113-2, of the folding document in a back view portion 106 of the GUI based input to the GUI 100 shown in FIG. 1. In one example, the second area 113-2 can include an area that is on an opposite side of the folding document relative to the first area 113-1. For instance, the display of the first area may provide an intended front view of a folding document being created according to embodiments described herein. In this example, the second area 113-2 may provide an intended back view of a folding document being created according to examples described herein.

In the example GUI 100 shown in FIG. 1, a second sub-set 112-P and 114 of the plurality of selectable panels 108 can be displayed as a second area 115-2 of the folding document. The display engine 236 or display modules 246 can provide the display of selected panels in the second area 115-2 based on input to the GUI 100. As shown in this example, at least one of the selected panels, e.g., 114, can include an empty panel. As above, a second area engine 235 shown in FIG. 2A, the second area module 244 shown in FIG. 2B, or the configuration module 252 shown in FIG. 2C can connect the edges of the plurality of selectable panels, e.g., 112-P and 114, based on input received to the GUI 100 to create shared edges representing reverse sides of the folds of the folding document represented by the connection of edges of the first sub-set, e.g., 112-4 and 112-5 of the plurality of selectable panels 108.

In various examples, the method 350 can include changing content of at least one of the selectable panels when displayed in the front view portion 104 and/or the back view portion 106 of the GUI 100. For instance, the first area engine 234 in FIG. 2A, the first area module 244 in FIG. 2B, or the configuration module 252 in FIG. 2C can operate on a selected panel of a first area e.g., 113-1 of a folding document while the selected panel is displayed in the front view portion 104 of the GUI 100 to edit graphics or text to the selected panel based on input received to the GUI 100. Editing a panel and/or changing content of a panel, as used herein, can include revising text in a panel, changing pictures in a panel, revising formatting of a panel, changing layouts, and/or color schemes of a panel, among other revisions. The display engine 236 in FIG. 2A or the display modules 246 in FIGS. 2B and 2C can display the changed content of a panel of the first sub-set of the plurality of selectable panels being operated upon in response to the input received to the GUI.

Likewise, the second area engine 235 in FIG. 2A, the second area module 245 in FIG. 2B, or the configuration module 252 in FIG. 2C can operate on a selected panel of a second area 113-2 of a folding document while the selected panel is displayed in the back view portion 106 of the GUI 100 to edit graphics or text to the selected panel based on input received to the GUI 100. The display engine 236 in FIG. 2A or the display modules 246 in FIGS. 2B and 2C can display the changed content of panel of the second sub-set of the plurality of selectable panels being operated upon in response to the input received to the GUI.

In some examples, the method 350 can include automatically aligning and/or re-sizing a panel when the panel is connected to a different panel. For example, the first area engine 234 in FIG. 2A, first area module 244 in FIG. 2B, or configuration module 252 in FIG. 2C can function based on input to the GUI 100 to automatically align and/or resize a selected panel in the first area 113-1 of the folding document. Likewise, the second area engine 235 in FIG. 2A, the second area module 245, or the configuration module 252 in FIG. 2C can function based on input to the GUI 100 to automatically align and/or resize a selected panel in the second area 113-2 of the folding document.

To illustrate, a selected panel can be selected from among the plurality of panels 108 shown in FIG. 1 and dragged into the front view portion 104 of the GUI 100. The selected panel may be a different size than another selected panel already placed in the front view portion 104 of the GUI 100. Based on input received to the GUI 100, e.g., via touchscreen, cursor, etc., the newly selected panel can be placed in proximity to the other panel. In this example, the first area engine 234 in FIG. 2A, first area module 244 in FIG. 2B, or the configuration module 252 in FIG. 2C can function in response to this input to the GUI 100 to connect an edge of the other panel to an edge of the newly selected panel to create a shared edge for a first area 113-1 of the folding document. Further, the first area engine 234 in FIG. 2A, first area module 244 in FIG. 2B, or the configuration module 252 in FIG. 2C can function in response to this input to the GUI 100 to automatically align the new panel to the first panel and/or to automatically re-size the new panel to match the size of the other panel. The display engine 236 and/or display modules 246 can function to display the aligned and/or re-sized newly selected panel and previously selected panel in the front view portion 104 of the GUI 100.

In some examples in accordance with the present disclosure, a portion of the first sub-set of panels and/or the second sub-set of panels can be connected along edges but input received to the GUI 100 may cause the first/second area engines 234/235, the first/second area modules 244/245, or the configuration module 252 not to create a shared edge representing a fold. That is, two or more panels can be connected to form a first area 113-1 and/or second area 113-2 of folding document without an intended folding point therebetween. Thus, the a first area 113-1 and/or second area 113-2 of the folding document can include the sum of several selected panels that have been connected in areas that are not intended to be folded based on input to the GUI 100. The first area engine 234 and/or the second area engine 235 in FIG. 2A can create such changes to the first area, 113-1, or second area, 113-2, respectively, in response to additional input to the GUI 100.

Figure 4A:
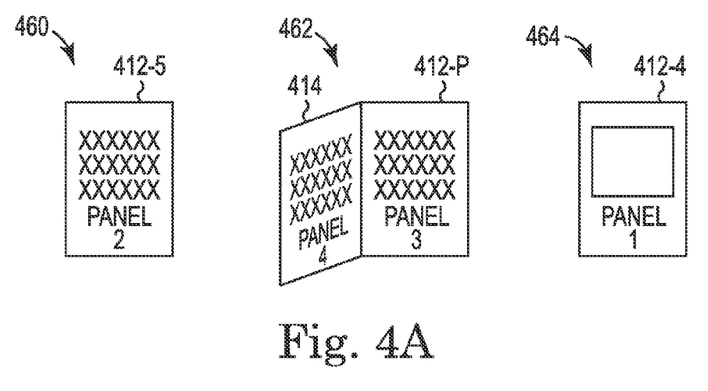
FIGS. 4A-4B illustrate examples of controlling and operating a GUI to display folding documents according to the present disclosure.

FIGS. 4A-4B illustrate examples of a sequence of views displayable on a GUI, such as the GUI 100, to create and display folding documents according to the present disclosure. The example shown in FIG. 4A illustrates an example sequence of views, 460, 462 and 464 for the second folding document in the GUI of FIG. 1 and having two joined panels 112-4 and 112-5 in a first area 115-1 of the folding document and two joined panels 112-P and 114 in a second area 115-2 of the folding document. In operation, the display engine 236 or display modules 246 operate to produce and control the illustrated sequence of three-dimensional (3D) views, 460, 462, and 464 according to this example, based on input to the GUI 100 to demonstrate the appearance that a folding document will have when printed and folded along the representations of the intended folds to the folding document.

Figure 4B:
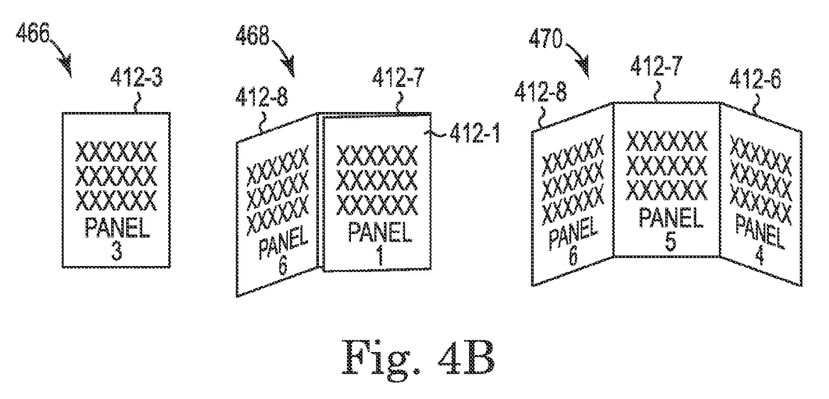

The example embodiment shown in FIG. 4B illustrates an example sequence of views, 466, 468 and 470 for the first folding document in the GUI of FIG. 1 having three joined panels 112-1, 112-2, and 112-3 in a first area 113-1 of the folding document and three joined panels 112-6, 112-7, and 112-8 in a second area 113-2 of the folding document. In operation, the display engine 236 or display modules 246 operate to produce and control the illustrated sequence of three-dimensional (3D) views, 466, 468, and 470 according to this example, based on input to the GUI 100 to demonstrate the appearance that a folding document will have when printed and folded along the representations of the intended folds to the folding document.

In the example of FIG. 4A, the numbering of the panels corresponds to that shown for the second document in the GUI 100 of FIG. 1, e.g., panels 112-4, 112-5, 112-P, and 114. For example, panel 112-5 of FIG. 1 can include the same panel 412-5 illustrated in FIG. 4A, etc. In the example of FIG. 4B, the numbering of the panels corresponds to that shown for the first document in the GUI 100 of FIG. 1, e.g., panels 112-1, 112-2, 112-3, 112-6, 112-7, 112-8. For example, panel 412-3 of FIG. 4B can include the same panel illustrated as panel 112-3 in FIG. 1. Examples, however, are not limited to the example 3-D sequence of views shown in FIGS. 4A and 4B.

The sequence of views 460, 462 and 464 shown in FIG. 4A illustrates an example sequence of 3D views of a folding document containing one intended fold and four connected panels. In operation, the display engine 236 or display modules 246 function in response to input to the GUI 100 to provide a first view 460. This example first view 460 in the sequence can include a representation of a view of the folding document when the folding document is folded in an intended manner with the intended cover to the folding document as facing the viewer. That is, the first view 460 can include a view of the folding document prior to a user opening the folding document. As illustrated in FIG. 4A, the first view 460 can include the second panel 412-5. Thereby, the second panel 412-5 is intended to serve as a cover of the folding document.

In operation the display engine 236 or display modules 246 can further function in response to input to the GUI 100 to provide a second view 462. The second view 462 in the sequence can include a representation of a view of the folding document when the folding document is opened along the intended fold. The second view 462 can include the third panel 412-P and the fourth panel 414. That is, the third panel 412-P and the fourth panel 414 are intended to serve as panels on the inside of the folding document in this example.

As illustrated by the second view 462, the display engine 236 or display modules 246 function based on input to the GUI 100 to provide the second view 462 in a 3D display. A 3D display, as used herein, can include rotation of a particular panel of a folding document displayed in the GUI 100 such that a portion of the particular panel appears closer to a viewer than the remaining panels of the folding document displayed in the GUI 100. For example, as illustrated in the second view 462, the display engine 236 or display modules 246 can function based on input to the GUI 100 to rotate the fourth panel 414 in the GUI such that a portion of the fourth panel 414 appears closer to a viewer than the third panel 412-P and such that both the fourth panel 414 and the third panel are open to and facing the viewer.

As shown in FIG. 4A, the display engine 236 or display modules 246 can function based on input received to the GUI 100 to provide a third view 464. The example third view 464 in the sequence can include a representation of a view of the folding document as the folding document is closed along the intended fold. In this example embodiment, the third view 464 illustrates the first panel 414-4, intended as a back cover to the intended folding document, facing the viewer. Although the example of FIG. 4A illustrates the views in order of the first view 460, the second view 462, and the third view 464, examples in accordance with the present disclosure are not so limited. According to examples of the present disclosure, the display engine 236 or display modules 246 can function based on input to the GUI 100 to provide the any number of views in the sequence of views in any variety of orders, for instance.

FIG. 4B illustrates an example sequential 3D view of a folding document containing two folds and six panels. The folding document can include, for instance, the first folding document 113 created and displayed from the first area 113-1 and 113-2 in the GUI 100 of FIG. 1. Thus, the example sequence of views 466, 468, and 470 can include panels 412-1, 412-2, 312-3, 412-6, 412-7, and 412-8, corresponding to panels 112-1, 112-2, 112-3, 112-6, 112-7, and 112-8 shown in the GUI of FIG. 1. The folding document illustrated in FIG. 4B can be created by a first area engine/module 234/244, a second area engine/module 235/245, or configuration module 252 as the same have been described herein. In operation, the display engine 236 or display modules 246 can function in response to input received to the GUI 100 to a first view 466. The example first view 466 can include a view of the folding document prior to a user opening the folding document. As illustrated in example of FIG. 4B, the first view 466 displays a third panel 412-3, e.g., panel 112-3 in the GUI 100, as a cover of the folding document.

Likewise, input received to the GUI 100 can cause the display engine 236 or display modules 246 to provide a second view 468 in a sequence of 3-D views for a user. The example second view 468 in the sequence is displaying a representation of a view of the folding document when the folding document is opened along a first fold in a particular arrangement of the panels. That is, the display engine 236 or display modules 246 can operate based on input to the GUI 100 to display opening the folding document along the first fold to illustrate opening the cover of the folding document. In this example folded arrangement, the second view 468 displays in 3-D the sixth panel 412-8 and first panel 412-1 interior to the opened cover. The fourth panel 412-6 and the fifth panel 412-7, e.g., 112-6 and 112-7 in the GUI 100 of FIG. 1, are displayed covered by the first panel 412-1. Hence, in this example, the first panel 412-1, the fourth panel 412-6, the fifth panel 412-7, and the sixth panel 412-8 can include panels on the inside of the folding document.

In operation, the display engine 236 or display modules 246 operate based on inputs to the GUI 100 to display the second view 468 as a 3D display. Further, according to embodiments, the display engine 236 or display modules 246 can operate based on input to the GUI 100 to rotate the sixth panel 412-8 in the GUI, e.g., GUI 100 in FIG. 1, such that a portion of the sixth panel 412-8 appears closer to a viewer than the first panel 412-1.

The display engine 236 or display modules 246 can further operate in response to input to the GUI 100 to provide a third view 470 in the sequence. In this example, the third view 470 in the sequence displays a representation of a view of the folding document as the folding document is opened along a second fold. That is, the display engine 236 or display modules operate based on input received to the GUI 100 to display a third view 470 that displays the folding document fully opened with the fourth panel 412-6, the fifth panel 412-7, and the sixth panel 412-8 viewable.

Again, the display engine 236 or display modules 246 operate based on inputs to the GUI 100 to display the third view 470 as a 3D display. In this example, the display engine 236 or display modules 246 can operate based on inputs received to the GUI to rotate the fourth panel 412-6 and the sixth panel 412-8 in the GUI, e.g., about the first and second folds such that a portion of the fourth panel 412-6 and the sixth panel 412-8 appear closer to the viewer than the fifth panel 412-7.

In some examples, the display engine 236 or display modules 246 can operated based on input received to the GUI 100 to provide additional views to the sequence of views, e.g., a fourth view (not shown in FIG. 4B. For example, a fourth view in this example could include a representation of view of the folding document as the folding document is closed along the second fold and the first fold, and oriented with the cover side down, e.g., the third panel 412-3 side down. In such a scenario, the fourth view would display the second panel 412-2 (not shown), e.g., panel 112-2 in the GUI 100 of FIG. 1. In that instance, the second panel 412-2 would thereby be displaying a back cover of the folding document.

Although the present examples illustrates an example sequence of views is illustrated in the order of a first view 466, a second view 468, and a third view 470, examples in accordance with the present disclosure are not so limited. The display engine 236 and display modules 246 can operate based on inputs received to the GUI 100 to provide views on the GUI 100 in any number and sequence. In this manner, the display engine 236 and display modules 246 can operate based on inputs received to the GUI 100 to produce a variety of 3D views that make the folding document appear as though a user is flipping open panels and using of the folding document as intended when printed.

Further, although the present examples of FIGS. 4A-4B illustrate folds along a vertical edge of panels, examples in accordance with the present disclosure are not so limited. The folds of the folding documents can include one or more vertical, diagonal, and/or horizontal folds and can include combinations thereof.

In the detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, the designator "P" particularly with respect to reference numerals in the drawings, indicate that a number of the particular feature so designated can be included with a number of examples of the present disclosure.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A non-transitory computer-readable medium storing instructions executable by a processing resource to cause a computer to:
   connect an edge of a first panel of a plurality of panels to an edge of a second panel of the plurality of panels in response to a first input to a graphical user interface (GUI) to create a first shared edge representing a fold of a first option of a folding document, wherein the first panel and second panel are located in a first area of the folding document, and wherein the first option of the folding comprises a vertical fold, a horizontal fold, and a diagonal fold;
   connect an edge of a third panel of the plurality of panels to an edge of a fourth panel of the plurality of panels in response to a second input to the GUI to create a second shared edge representing a reverse side of the fold of the first option of the folding document, wherein the third panel and fourth panel are located in a second area of the folding document;

connect an edge of a fifth panel of the plurality of panels to an edge of a sixth panel of the plurality of panels in response to a third input to the GUI to create a third shared edge representing a fold of a second option of the folding document, wherein the fifth panel and sixth panel are located in the first area of the folding document;

connect an edge of a seventh panel of the plurality of panels to an edge of an eight panel of the plurality of panels in response to a fourth input to the GUI to create a fourth shared edge representing a reverse side of the fold of the second option of the folding document, wherein the seventh panel and eighth panel are located in the second area of the folding document;

position remaining panels of the plurality of panels in response to additional input, such that the folding document comprises at least two folds, wherein the first area and the second area of the folding document comprise sums of a plurality of selected panels that are connected in areas that are not intended to be folded in response to the additional input; and display the first option and the second option of the folding document side-by-side in the first area and display the first area and the second area of the folding document concurrently in the GUI.

2. The non-transitory computer-readable medium of claim 1, wherein the instructions executable by the processing resource to display the first area and the second area include instructions executable to:

display a front view of the folding document in the first area and display a back view of the folding document in the second area, wherein the second area is on an opposite side of the folding document relative to the first area.

3. The non-transitory computer-readable medium of claim 1, wherein the instructions executable by the processing resource include instructions executable to:

provide a display of a plurality of panels, including the first panel, the second panel, the third panel and the fourth panel, on a portion of the GUI, wherein each of the plurality of panels includes a predefined area for editable content that is not to be folded.

4. The non-transitory computer-readable medium of claim 1, wherein the instructions executable by the processing resource include instructions executable to:

display the first area of the folding document in a front view portion of the GUI; and display the second area of the folding document in a back view portion of the GUI, wherein the front view portion of the GUI includes an editing portion of the GUI.

5. The non-transitory computer-readable medium of claim 4, wherein the instructions executable by the processing resource include instructions executable to:

switch the display of the first area of the folding document from a front view portion of the GUI to a back view portion of the GUI; and switch the display of the second area of the folding document from a back view portion of the GUI to a front view portion of the GUI in response to an input to the GUI.

6. A method for displaying a folding document, comprising:

providing, using a configuration engine, a plurality of selectable panels for a user to select in a graphical user interface (GUI), wherein at least one of the plurality of selectable panels includes a predefined area for editable content;

displaying, using a display engine, a first area of a folding document in a front view portion of the GUI including a first sub-set of the plurality of selectable panels representing a first option of the folding document and a second sub-set of the plurality of selectable panels representing a second option of the folding document displayed side-by-side, wherein the first option of the folding comprises a vertical fold, a horizontal fold, and a diagonal fold;

connecting, using a configuration engine, the first sub-set of the plurality of selectable panels along edges of the panels to create shared edges representing folds of the first option of the folding document, such that the first option of the folding document comprises at least two folds;

connecting, using the configuration engine, the second sub-set of the plurality of selectable panels along edges of the panels to create shared edges representing folds of the second option of the folding document, such that the second option of the folding document comprises at least two folds; and displaying, using the display engine, a second area of the folding document concurrently with the first area of the folding document in a back view portion of the GUI, wherein the second area includes an area that is on an opposite side of the folding document relative to the first area, and wherein the first area and the second area of the folding document comprise sums of a plurality of selected panels that are connected in areas that are not intended to be folded in response to input to the GUI.

7. The method of claim 6, including using the display engine to switch the display of the second area of the folding document to the front view portion of the GUI and to switch the display of the first area of the folding document to the back view portion of the GUI by rotating the folding document about an axis.

8. The method of claim 6, including using the configuration engine to change a content in at least one of the first sub-set of the plurality of selectable panels in response to different input to the GUI while the first sub-set of the plurality of selectable panels are displayed in the front view portion of the GUI.

9. The method of claim 6, including using the configuration engine to connect the panels along at least two of horizontal edges, vertical edges, and diagonal edges of the panels.

10. The method of claim 6, including:

switching the display of the first area and the second area of the folding document; and changing content in at least one of a first sub-set of the plurality of selectable panels in response to user input while the first sub-set of the plurality of selectable panels are displayed in the back view portion of the GUI.

11. The method of claim 6, further comprising displaying concurrently, using the display engine and via the GUI, a plurality of layouts and designs of the folding document.

12. The method of claim 6, further comprising revising, using the configuration engine, at least one of the size, shape, and orientation of at least one of the plurality of selectable panels.

13. A system, comprising:
- a panel engine using hardware to import a plurality of panels, each of the plurality of panels including a predefined page of informative content;
- a first area engine using hardware to connect an edge of a first panel and an edge of a second panel among the plurality of panels in a first area of a folding document in response to input to a graphical user interface (GUI) to create a first shared edge representing a fold of a first option of the folding document,
  - wherein the first option of the fold comprises a vertical fold, a horizontal fold, and a diagonal fold;
- a second area engine using hardware to connect an edge of a third panel and an edge of a fourth panel among the plurality of panels in a second area of the folding document in response to input to the GUI to create a second shared edge representing a reverse side of the fold of the first option of the folding document;
- the first area engine using hardware to connect an edge of a fifth panel and an edge of a sixth panel among the plurality of panels in the first area of the folding document in response to input to a graphical user interface (GUI) to create a third shared edge representing a fold of a second option of the folding document;
- the second area engine using hardware to connect an edge of a seventh panel and an edge of a eighth panel among the plurality of panels in the second area of the folding document in response to input to the GUI to create a fourth shared edge representing a reverse side of the fold of the second option of the folding document;
- the first area engine and the second area engine using hardware to position remaining panels of the plurality of panels in response to additional input, such that the second option of the folding document comprise at least two folds;
- a display engine using hardware to:
  - display the first option of the folding document and the second option of the folding document side-by-side in the first area of the folding document;
  - display the first area of the folding document including the first panel, the second panel, the fifth panel, and the sixth panel in a front view portion of the GUI;
  - display the second area of the folding document including the third panel, the fourth panel, the seventh panel, and the eighth panel in a back view portion of the GUI,
    - wherein the first area and the second area are displayed concurrently in the front view portion of the GUI; and
  - revise the display of the second area to include the third panel and the fourth panel as connected along a different shared edge; and
- a convert engine using hardware to convert the displayed first area and the displayed revised second area of the folding document to a printable format,
- wherein the first area and the second area of the folding document comprise sums of a plurality of selected panels that are connected in areas that are not intended to be folded in response to the additional input.

14. The system of claim 13, wherein the display engine further provides a three dimensional view of the folding document when folded along the representation of the fold based on input to the GUI.

15. The system of claim 13, wherein the first area engine disconnects the first panel and the second panel in response to input to the GUI.

16. The system of claim 13, wherein the first area engine connects a ninth panel to the second panel in response to input to the GUI.

17. The system of claim 13, wherein the at least two folds comprise at least two of a horizontal fold, a vertical fold, and a diagonal fold.

18. The system of claim 13, wherein:
- the horizontal fold comprises a fold created by connecting horizontal edges of two of the plurality of panels relative to a horizontal orientation from a particular view; and
- the vertical fold comprises a fold created by connecting vertical edges of two of the plurality of panels relative to a particular view.

19. The system of claim 13, wherein the first option of the folding document comprises more than six panels.

* * * * *